United States Patent
Ito

(10) Patent No.: US 11,249,361 B2
(45) Date of Patent: Feb. 15, 2022

(54) ELECTRO-OPTICAL DEVICE AND ELECTRONIC APPARATUS

(71) Applicant: SEIKO EPSON CORPORATION, Tokyo (JP)

(72) Inventor: Satoshi Ito, Eniwa (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 16/823,868

(22) Filed: Mar. 19, 2020

(65) Prior Publication Data

US 2020/0301222 A1 Sep. 24, 2020

(30) Foreign Application Priority Data

Mar. 20, 2019 (JP) .............................. JP2019-052254

(51) Int. Cl.
*G02F 1/1362* (2006.01)
*G02F 1/1343* (2006.01)
*G02F 1/1339* (2006.01)
*G03B 21/00* (2006.01)

(52) U.S. Cl.
CPC .... *G02F 1/136286* (2013.01); *G02F 1/13439* (2013.01); *G03B 21/006* (2013.01); *G02F 1/1339* (2013.01); *G02F 1/13629* (2021.01)

(58) Field of Classification Search
CPC ..... G02F 1/136286; G02F 2001/13629; G02F 1/1339; G02F 1/13452
See application file for complete search history.

(56) References Cited

U.S. PATENT DOCUMENTS

2001/0053570 A1* 12/2001 Kido ................... H01L 27/1214
438/149
2007/0296050 A1* 12/2007 Murade ................. G02F 1/1345
257/432
2007/0296899 A1* 12/2007 Murade ................. G02F 1/1345
349/139

(Continued)

FOREIGN PATENT DOCUMENTS

JP  2001-083543 A  3/2001
JP  2008-003384 A  1/2008

(Continued)

*Primary Examiner* — Michael H Caley
*Assistant Examiner* — Jonathan Y Jung
(74) *Attorney, Agent, or Firm* — Oliff PLC

(57) ABSTRACT

An electro-optical device includes a wiring substrate including a wiring line, a common electrode, a conduction member that is electrically conductive, the conduction member being configured to electrically couple the wiring line and the common electrode, a pixel electrode disposed between the wiring substrate and the common electrode, and an electro-optical layer disposed between the pixel electrode and the common electrode. The wiring substrate includes: an insulating layer disposed between the wiring line and the common electrode, a conduction electrode between the insulating layer and the common electrode and in contact with the insulating layer, the conduction member being disposed at the conduction electrode, and a contact portion composed of a material different from the conduction electrode and penetrating the insulating layer, the contact portion being configured to electrically couple the conduction electrode and the wiring line.

4 Claims, 9 Drawing Sheets

(56) References Cited

U.S. PATENT DOCUMENTS

| | | | | |
|---|---|---|---|---|
| 2017/0153518 A1* | 6/2017 | Tang | ............... | G02F 1/133512 |
| 2017/0293170 A1* | 10/2017 | Miyawaki | ......... | G02F 1/133371 |
| 2018/0348581 A1* | 12/2018 | Abe | ................ | H01L 27/1262 |
| 2019/0204638 A1* | 7/2019 | Park | ................ | G02F 1/1339 |

FOREIGN PATENT DOCUMENTS

| | | |
|---|---|---|
| JP | 2008-008944 A | 1/2008 |
| JP | 2013-235127 A | 11/2013 |
| JP | 2018-146870 A | 9/2018 |

* cited by examiner

ELECTRO-OPTICAL DEVICE AND ELECTRONIC APPARATUS

The present application is based on, and claims priority from JP Application Serial Number 2019-052254, filed Mar. 20, 2019, the disclosure of which is hereby incorporated by reference herein in its entirety.

BACKGROUND

1. Technical Field

The present disclosure relates to an electro-optical device and an electronic apparatus.

2. Related Art

An electro-optical device, such as a liquid crystal display device, used as a light valve of a projector, for example, is known. JP-A-2001-83543 discloses a liquid crystal display device including a first substrate in which a wiring line and an insulating film covering the wiring line are formed, a second substrate in which an electrode is formed, and a liquid crystal provided between the first substrate and the second substrate. Contact holes are formed in four corners of the insulating film having a rectangular shape in plan view. At the contact hole, an ITO film coupled to the wiring line across the inside and outside is formed. By a spherical conductor provided in the contact hole, the wiring line of the first substrate and the electrode of the second substrate are electrically coupled, and the distance between the first substrate and the second substrate is defined.

In a configuration in which a spherical conductor is provided in the contact hole, the distance between the substrates may be largely varied when the spherical conductor protrudes from the contact hole. As a result, the display quality is degraded.

SUMMARY

An aspect of the electro-optical device according to the present disclosure includes a wiring substrate including a wiring line, a common electrode, a conduction member that is electrically conductive, the conduction member being configured to electrically couple the wiring line and the common electrode, a pixel electrode disposed between the wiring substrate and the common electrode, and an electro-optical layer disposed between the pixel electrode and the common electrode, and including an electro-optical material, optical characteristics of which change due to an electric field between the pixel electrode and the common electrode. The wiring substrate includes: an insulating layer disposed between the wiring line and the common electrode, a conduction electrode between the insulating layer and the common electrode and in contact with the insulating layer, the conduction member being disposed at the conduction electrode, and a contact portion composed of a material different from that of the conduction electrode and penetrating the insulating layer, the contact portion being configured to electrically couple the conduction electrode and the wiring line.

DESCRIPTION OF EXEMPLARY EMBODIMENTS

Figure 1:
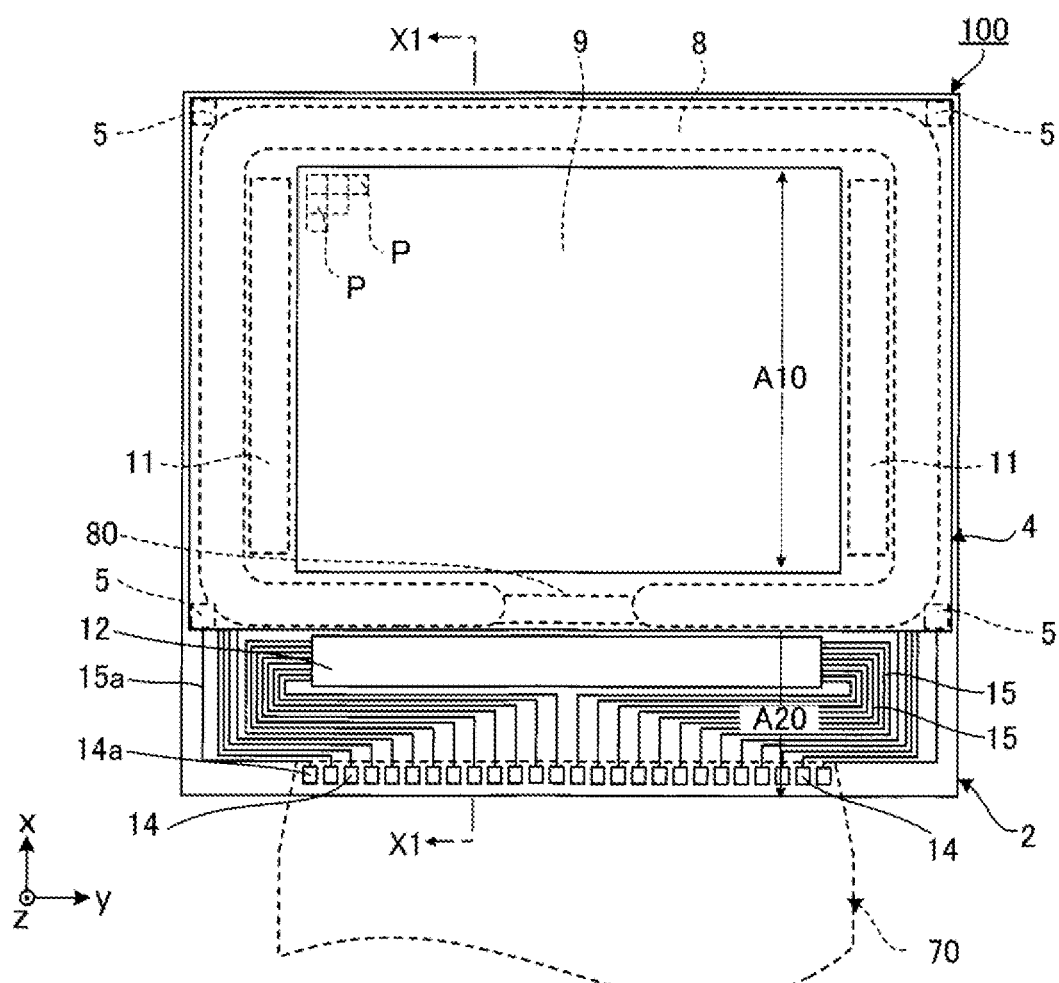
FIG. 1 is a plan view of an electro-optical device according to a first embodiment.

Preferred embodiments of the present disclosure will be described below with reference to the accompanying drawings. Note that, in the drawings, dimensions and scales of sections are differed from actual dimensions and scales as appropriate, and some of the sections are schematically illustrated to make them easily recognizable. Further, the scope of the present disclosure is not limited to these embodiments unless otherwise limited in the present disclosure in the following descriptions.

1. Electro-Optical Device

A liquid crystal device of an active matrix type is described as an example of the electro-optical device of the present disclosure.

1-1. First Embodiment

1-1(a). Basic Configuration

Figure 2:
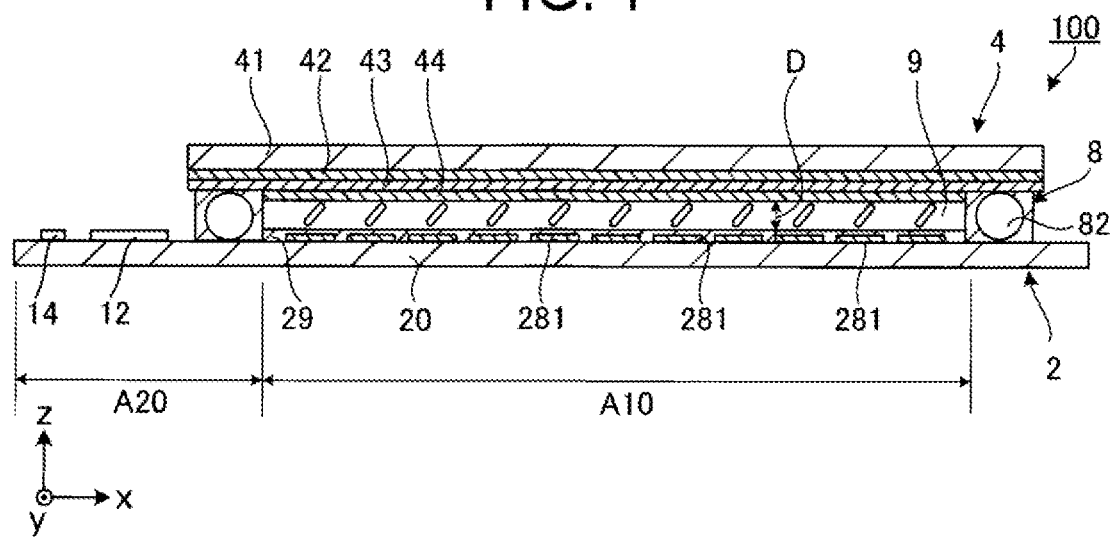
FIG. 2 is a cross-sectional view of the electro-optical device according to the first embodiment.

FIG. 1 is a plan view of an electro-optical device 100 according to a first embodiment. FIG. 2 is a cross-sectional view of the electro-optical device 100 according to the first embodiment, and is a cross-sectional view taken along X1-X1 in FIG. 1. Note that, for convenience of description, an x-axis, a y-axis, and a z-axis orthogonal to each other as illustrated in FIGS. 1 and 2 are appropriately used for the description. In the following description, the tip end side of the arrow indicating the direction of each axis is referred to as the "+ side" and the base end side of the arrow is referred to as the "− side". In addition, in the x-axis, the direction indicated by the arrow is set as +x direction, and the direction opposite to +x direction is set as −x direction. The same applies to the y-axis and the z-axis. In addition, the thickness direction of a wiring substrate 20, which will be described later, is parallel to the −z direction. In addition, viewing from the −z direction is referred to simply as a "plan view".

The electro-optical device 100 illustrated in FIGS. 1 and 2 is a liquid crystal device of a transmission type. As illustrated in FIG. 2, the electro-optical device 100 includes an optically transparent device substrate 2, an optically transparent counter substrate 4, a frame-shaped sealing member 8, and a liquid crystal layer 9 as an "electro-optical layer". The sealing member 8 is disposed between the device substrate 2 and the counter substrate 4. The liquid crystal layer 9 is disposed in a region surrounded by the device substrate 2, the counter substrate 4, and the sealing member 8. Here, the −z direction is the direction in which the counter substrate 4, the liquid crystal layer 9, and the device substrate 2 are arranged, and the surface of the device substrate 2 is parallel to the x-y plane.

Light may enter the electro-optical device 100 from the device substrate 2 so as to be transmitted through the liquid crystal layer 9 and emitted from the counter substrate 4, or may enter the electro-optical device 100 from the counter substrate 4 so as to be transmitted through the liquid crystal layer 9 and emitted from the device substrate 2. The light transmitted through the electro-optical device 100 is visible light. In the present specification, the optical transparency means transparency to visible light, and preferably means that the transmittance of visible light is 50% or greater. While the electro-optical device 100 has a rectangular shape in plan view as illustrated in FIG. 1, the planar shape of the electro-optical device 100 is not limited to the rectangular shape and may be a circular shape or the like.

As illustrated in FIG. 1, the device substrate 2 has a size that encompasses the counter substrate 4 in plan view. As illustrated in FIG. 2, the device substrate 2 includes the wiring substrate 20, a plurality of pixel electrodes 281, and a first orientation film 29. The wiring substrate 20, the plurality of pixel electrodes 281, and the first orientation film 29 are arranged in this order. The first orientation film 29 is closest to the liquid crystal layer 9. The wiring substrate 20 includes various wiring lines. The wiring substrate 20 includes a plurality of external terminals 14 and a plurality of routed wiring lines 15 described later. The plurality of pixel electrodes 281 are arranged in a matrix in plan view. The pixel electrode 281 is optically transparent, and is composed of a transparent conductive material such as indium tin oxide (ITO) and indium zinc oxide (IZO), for example. The first orientation film 29 orients the liquid crystal molecules of the liquid crystal layer 9. Examples of the material of the first orientation film 29 include polyimide and silicon oxide.

As illustrated in FIG. 2, the counter substrate 4 includes a second substrate 41, an optically transparent layer 42, a common electrode 43, and a second orientation film 44. The second substrate 41, the optically transparent layer 42, the common electrode 43, and the second orientation film 44 are arranged in this order. The second orientation film 44 is closest to the liquid crystal layer 9. The second substrate 41 is composed of an optically transparent insulating plate. The second substrate 41 is composed of glass, quartz, or the like, for example. The optically transparent layer 42 is formed of an optically transparent insulating silicon based inorganic material such as silicon oxide, for example. The common electrode 43 is composed of a transparent conductive material such as ITO and IZO, for example. In this embodiment, the common electrode 43 is disposed substantially all over the region of the second substrate 41 in plan view. Note that the common electrode 43 may have a configuration including a plurality of strip electrodes that overlap the plurality of pixel electrodes 281 in plan view. The second orientation film 44 orients the liquid crystal molecules of the liquid crystal layer 9. Examples of the material of the second orientation film 44 include polyimide and silicon oxide.

The sealing member 8 is fixed to each of the device substrate 2 and the counter substrate 4. The sealing member 8 is formed of an adhesive containing various types of curable resins such as epoxy resin, for example. The sealing member 8 includes a gap member 82 for defining a gap D, which is a distance between the device substrate 2 and the counter substrate 4. Examples of the gap member 82 include glass fibers or glass beads. The shape of the gap member 82 is preferably a spherical shape in view of proper control of the gap D, but may be a shape other than a spherical shape such as a flake-like shape. In addition, as illustrated in FIG. 1, an injection port for injecting a liquid crystal material containing liquid crystal molecules is formed in a portion of the sealing member 8. The injection port is sealed with a sealing material 80 formed of various types of resin materials.

Four conduction members 5 for electrical conduction between the device substrate 2 and the counter substrate 4 are disposed outside the sealing member 8. Note that while the conduction members 5 are disposed in the corners of the counter substrate 4, the positions of the conduction member 5 is not limited thereto.

The liquid crystal layer 9 is interposed between the device substrate 2 and the counter substrate 4 such that the liquid crystal molecules are in contact with both the first orientation film 29 and the second orientation film 44. The liquid crystal layer 9 includes a liquid crystal that is an "electro-optical material". The liquid crystal contains liquid crystal molecules having positive or negative dielectric anisotropy. The orientations of the liquid crystal molecules change in accordance with the electric field between the pixel electrode 281 and the common electrode 43. Thus, the optical characteristics of the liquid crystal are changed by the electric field between the pixel electrode 281 and the common electrode 43. The liquid crystal layer 9 achieves a gray scale display by modulating the light in accordance with the applied voltage.

As illustrated in FIG. 1, a plurality of scanning line drive circuits 11 and a signal line drive circuit 12 are disposed on the surface of the device substrate 2 on the counter substrate 4 side. In the drawing, the scanning line drive circuit 11 overlaps the sealing member 8 in plan view.

In addition, a plurality of the external terminals 14 including a supply terminal 14a are provided on the wiring substrate 20 of the device substrate 2. An external wiring substrate 70 composed of a flexible wiring substrate or the like is coupled to each external terminal 14, and a signal or the like is applied to each external terminal 14 through the external wiring substrate 70. A fixed potential such as a ground potential is applied to the supply terminal 14a.

The routed wiring line 15, which is routed for the scanning line drive circuit 11, the signal line drive circuit 12 and the like, is coupled to each external terminal 14. Of the plurality of routed wiring lines 15, the routed wiring line 15 coupled to the supply terminal 14a is a first wiring line 15a as a "wiring line". The first wiring line 15a is used to supply the common electrode 43 with a fixed potential applied to the supply terminal 14a.

The electro-optical device 100 having the above-described configuration includes a display region A10 that displays images and the like, and a peripheral region A20 that surrounds the display region A10 in plan view. In the display region A10, a plurality of pixels P arranged in a matrix are provided. In the peripheral region A20, the scanning line drive circuit 11, the signal line drive circuit 12, the external terminal 14, the routed wiring line 15, the conduction member 5, the sealing member 8, and the like are disposed. Note that the display region A10 may include dummy pixels that do not contribute to display and are disposed to surround the plurality of pixels P in addition to the plurality of pixels P that contribute to display.

1-1b. Electrical Configuration

Figure 3:
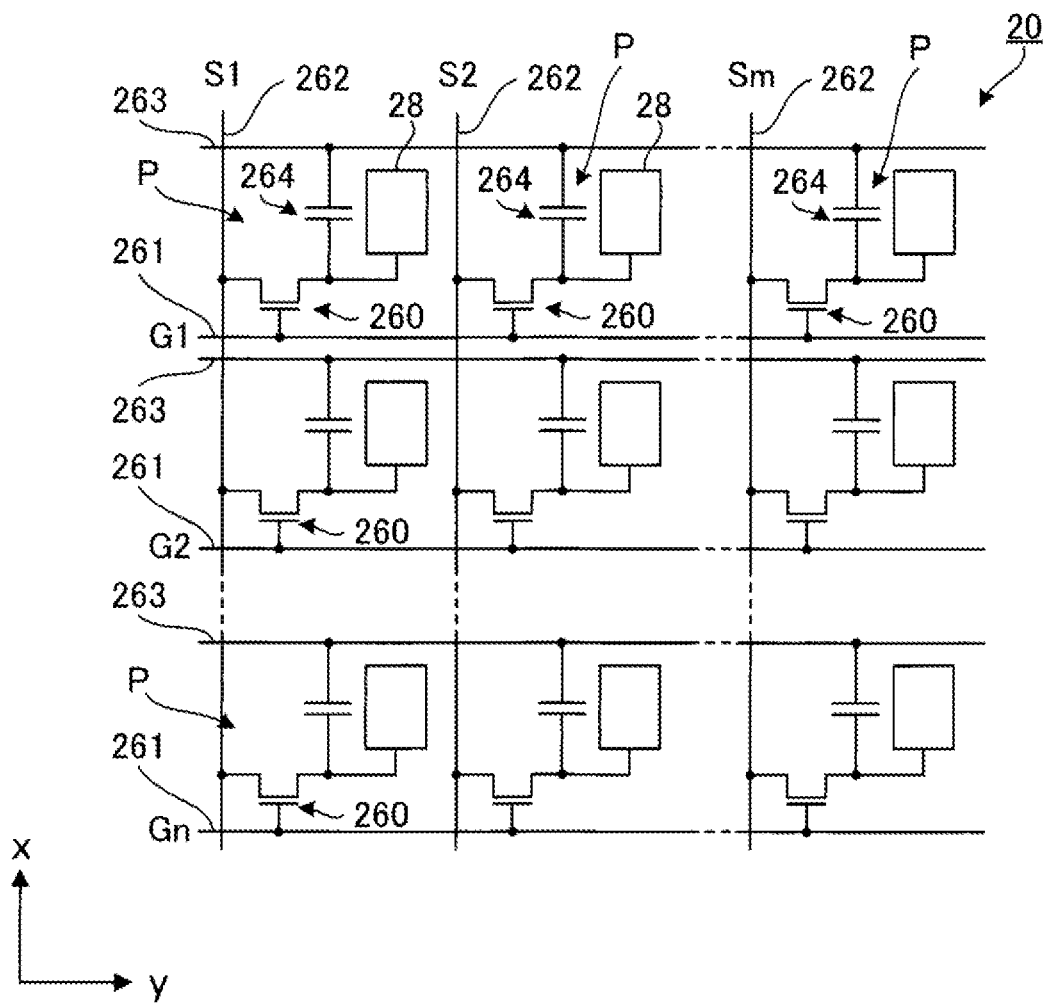
FIG. 3 is an equivalent circuit diagram illustrating an electrical configuration of a device substrate according to the first embodiment.

FIG. 3 is an equivalent circuit diagram illustrating an electrical configuration of the device substrate 2 according to the first embodiment. As illustrated in FIG. 3, in the wiring substrate 20 of the device substrate 2, n scanning lines 261, m signal lines 262, and n capacitance lines 263 are provided. The n and m are each an integer of 2 or greater. A TFT 260 that is a transistor is disposed so as to correspond to each of the intersections between the n scanning lines 261 and the m signal lines 262.

The n scanning lines 261 each extend in the +y direction and are arranged at equal intervals in the −x direction. The scanning lines 261 are electrically coupled to the gate of the TFT 260. The n scanning lines 261 are electrically coupled to the scanning line drive circuit 11 illustrated in FIG. 1. Scanning signals G1, G2, . . . , Gn are line-sequentially supplied to the n scanning lines 261 from the scanning line drive circuit 11.

The m signal lines 262 illustrated in FIG. 3 each extend in the −x direction and are arranged at equal intervals in the +y direction. The signal line 262 is electrically coupled to the source of the TFT 260. The m signal lines 262 are electrically coupled to the signal line drive circuit 12 illustrated in FIG. 1. Image signals S1, S2 . . . , and Sm are supplied to the m signal lines 262 in parallel from the signal line drive circuit 12 illustrated in FIG. 1.

The n scanning lines 261 and the m signal lines 262 illustrated in FIG. 3 are insulated from each other and are formed in a lattice pattern in plan view. A region surrounded by two adjacent scanning lines 261 and two adjacent signal lines 262 corresponds to the pixel P. Each pixel P is provided with one pixel electrode 281. Each pixel electrode 281 is provided with one corresponding TFT 260. The TFT 260 is a switching element that is electrically coupled to the corresponding pixel electrode 281 and is configured to perform switching control of the pixel electrode 281.

The n capacitance lines 263 each extend in the +y direction and are arranged at equal intervals in the −x direction. The n capacitance lines 263 are insulated from the plurality of signal lines 262 and the plurality of scanning lines 261, and are formed apart from these lines. For example, a fixed potential such as a ground potential is applied to the capacitance lines 263. A storage capacitor 264 is provided between the capacitance line 263 and the pixel electrode 281 in parallel to a liquid crystal capacitor to prevent leakage of charges retained in the liquid crystal capacitor. The storage capacitor 264 is electrically coupled to the drain of the TFT 30. The storage capacitor 264 is a capacitance element that retains the potential of the corresponding pixel electrode 281 in accordance with a supplied image signal Sm.

When the scanning signals G1, G2, . . . , Gn are sequentially activated and the n scanning lines 261 are sequentially selected, the TFT 260 coupled to the selected scanning line 261 is set to an ON state. Then, through the m signal lines 262, the image signals S1, S2, . . . , Sm having values corresponding to the grayscale to be displayed are taken into the pixel P corresponding to the selected scanning line 261, and are applied to the pixel electrode 281. As a result, a voltage corresponding to the grayscale to be displayed is applied to the liquid crystal capacitor formed between the pixel electrode 281 and the common electrode 43 of the counter substrate 4 illustrated in FIG. 2, and the orientations of the liquid crystal molecules change in accordance with the applied voltage. The applied voltage is retained by the storage capacitor 264. Such a change in orientations of the liquid crystal molecules modulates the light, and thus grayscale display is achieved.

1-1c. Device Substrate 2 in Display Region A10

Figure 4:
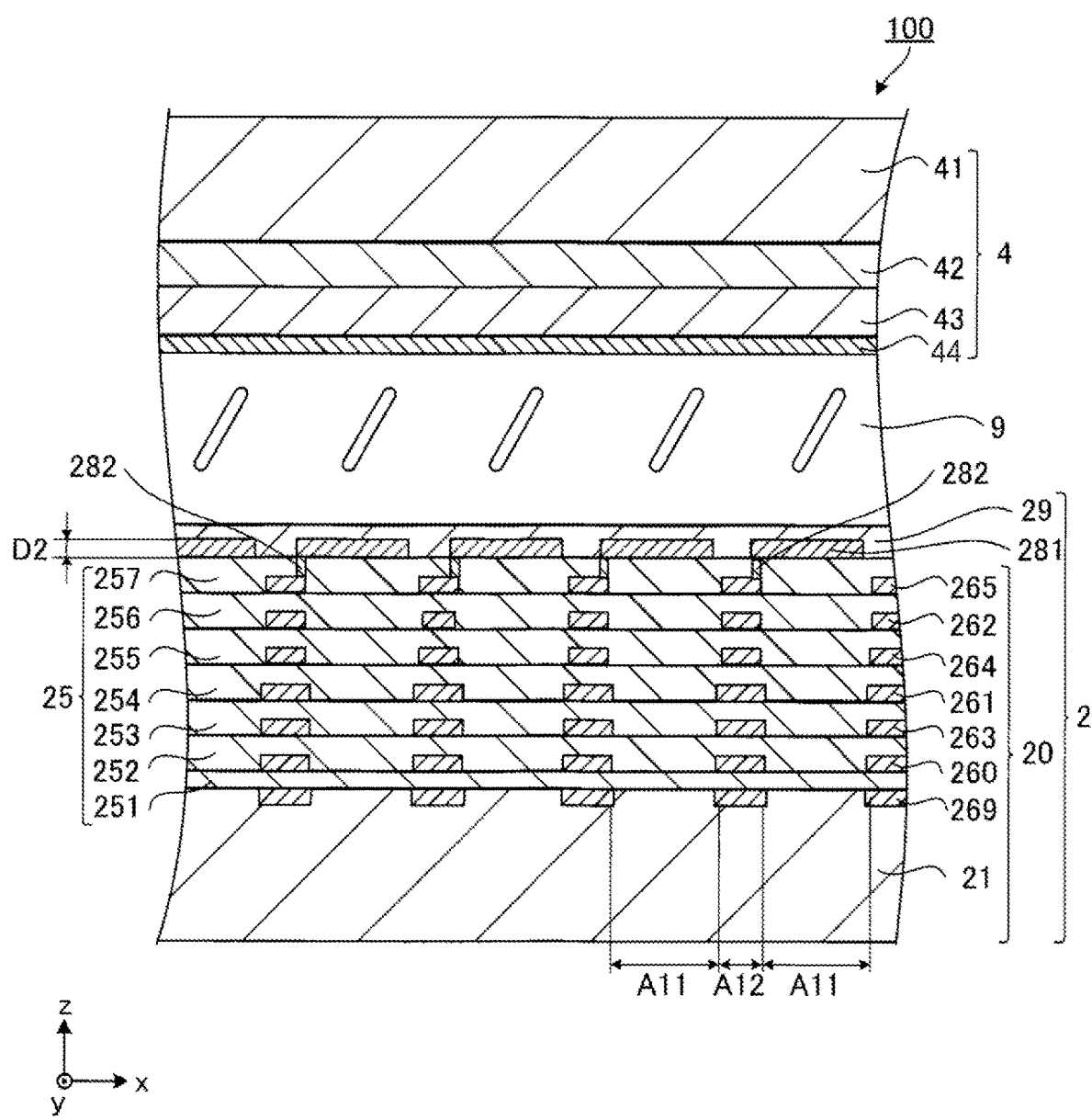
FIG. 4 is a partially enlarged view of a display region of the electro-optical device according to the first embodiment.

FIG. 4 is a partially enlarged view of the display region A10 of the electro-optical device 100 according to the first embodiment. Note that the various wiring lines and the like of the device substrate 2 are schematically illustrated.

As illustrated in FIG. 4, the wiring substrate 20 of the device substrate 2 includes a first substrate 21, a light-shielding film 269, the TFT 260, the capacitance line 263, the scanning line 261, the storage capacitor 264, the signal line 262, a second wiring line 265, and the insulator 25. The insulator 25 includes a first interlayer insulating film 251, a second interlayer insulating film 252, a third interlayer insulating film 253, a fourth interlayer insulating film 254, a fifth interlayer insulating film 255, a sixth interlayer insulating film 256, and a seventh interlayer insulating film 257 as an "insulating layer". They are arranged in this order from the first substrate 21 toward the liquid crystal layer 9. Note that, while the TFT 260, the capacitance line 263, the scanning line 261, the storage capacitor 264, the signal line 262, and the second wiring line 265 are arranged in this order from the first substrate 21 toward the liquid crystal layer 9, this arrangement order is an example, and the arrangement order is not limited to this arrangement order.

The first substrate 21 is composed of an optically transparent insulating plate. The first substrate 21 is composed of glass or quartz, for example. The light-shielding film 269 is disposed in a recessed portion formed in the first substrate 21. The light-shielding film 269 has a light-shielding property and prevents incidence of light on the TFT 260.

The optically transparent insulating insulator 25 is disposed on the first substrate 21 so as to cover the light-shielding film 269. The TFT 260 is disposed between the first interlayer insulating film 251 and the second interlayer insulating film 252. The capacitance line 263 is disposed between the second interlayer insulating film 252 and the third interlayer insulating film 253. The scanning line 261 is disposed between the third interlayer insulating film 253 and the fourth interlayer insulating film 254. The storage capacitor 264 is disposed between the fourth interlayer insulating film 254 and the fifth interlayer insulating film 255. The storage capacitor 264 includes, for example, an electrode electrically coupled to the drain of the TFT 260, an electrode electrically coupled to the capacitance line 263, and a dielectric layer disposed between the two electrodes.

The signal line 262 is disposed between the fifth interlayer insulating film 255 and the sixth interlayer insulating film 256. The second wiring line 265 is disposed between the sixth interlayer insulating film 256 and the seventh interlayer insulating film 257. The second wiring line 265 is a relay wiring line that is electrically coupled to the pixel electrode 281 through the second contact portion 282. In addition, the second wiring line 265 is electrically coupled to an electrode electrically coupled to the drain of the storage capacitor 264, through a contact (not illustrated). Thus, the second wiring line 265 is electrically coupled to the drain of the TFT 30.

Each of the various wiring lines such as the TFT 260, the scanning line 261, the capacitance line 263, and the signal line 262, and the light shielding film 269 is composed of metal such as tungsten (W), titanium (Ti) and aluminum (Al), a metal compound or the like. Specifically, the various wiring lines include a laminate of a film composed of titanium nitride and a film composed of aluminum, for example. The light-shielding film 269 is composed of, for example, a tungsten film. In addition, each layer of the insulator 25 is composed of a silicon based inorganic material such as silicon oxide, for example.

The wiring substrate 20 includes a plurality of light-transmitting regions A11 through which light is transmitted, and a wiring region A12 where the various wiring lines are disposed. The light-transmitting region A11 is substantially rectangular in plan view. The plurality of light-transmitting regions A11 are disposed in a matrix in plan view. In addition, the wiring region A12 blocks light. The wiring region A12 is provided in a lattice pattern in plan view. The wiring region A12 surrounds the light-transmitting region A11 in plan view.

In addition, the plurality of pixel electrodes 281 are disposed on the wiring substrate 20. One pixel electrode 281 and one light-transmitting region A11 overlap in plan view. One pixel electrode 281 and one light-transmitting region A11 are provided for each pixel P. Note that while the device substrate 2 does not include an optical member that focuses or diffuses light, such an optical member may be provided.

1-1d. Device Substrate 2 in Peripheral Region A20

Figure 5:
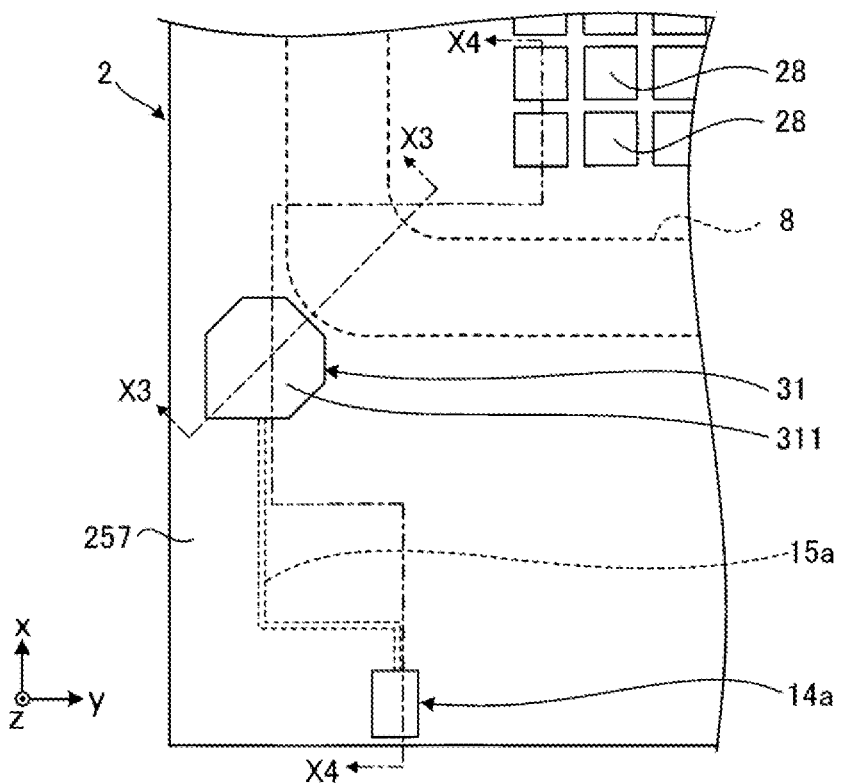
FIG. 5 is a partially enlarged cross-sectional view of a peripheral region of the device substrate according to the first embodiment.

FIG. 5 is a partially enlarged view of the peripheral region A20 of the device substrate 2 according to the first embodiment. As illustrated in FIG. 5, the supply terminals 14a and the first wiring line 15a described above are provided in the device substrate 2 in the peripheral region A20. In addition, a conduction terminal 31 electrically coupled to the first wiring line 15a is provided in the device substrate 2. The first wiring line 15a is disposed along the x-y plane from the supply terminal 14a toward the conduction terminal 31, and electrically couples the supply terminal 14a and the conduction terminal 31. In addition, the supply terminal 14a, the first wiring line 15a, and the conduction terminal 31 are disposed outside the sealing member 8 in plan view.

Figure 6:
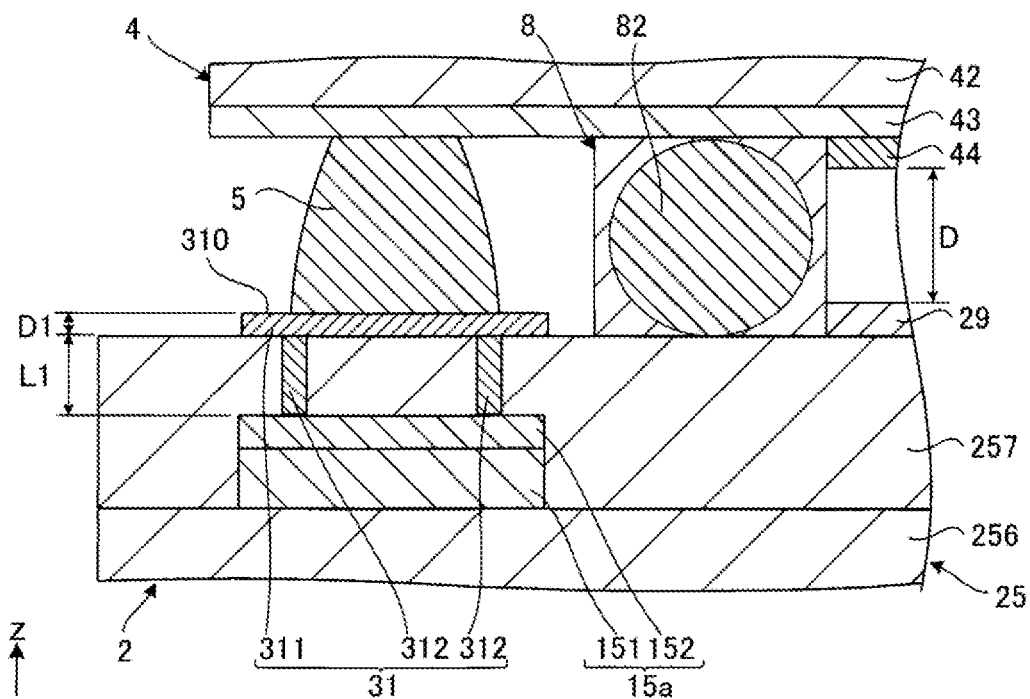
FIG. 6 is a partially enlarged view of a peripheral region of the electro-optical device according to the first embodiment.

FIG. 6 is a partially enlarged view of the peripheral region A20 of the electro-optical device 100 according to the first embodiment, and is a cross-sectional view taken along X3-X3 in FIG. 5. As illustrated in FIG. 6, the conduction member 5 is disposed between a conduction electrode 311 and the common electrode 43. The conduction member 5, which is in contact with the conduction electrode 311 and the common electrode 43 and is electrically coupled thereto, supplies a fixed potential from the conduction electrode 311 to the common electrode 43.

The conduction member 5 is formed of, for example, a conductive paste containing conductive particles having conductivity. Specifically, for example, the conduction member 5 is formed of a silver paste containing silver nanoparticles as conductive particles. The diameter of the conduction particle is preferably smaller than or equal to the diameter of the gap member 82. With such a configuration, the gap D can be appropriately controlled by the gap member 82 without being affected by the conduction particles. Note that the shape of the conduction particle is not limited to a spherical shape, and may be a flake-like shape or the like.

The conduction terminal 31 is disposed at the insulator 25. The conduction terminal 31 includes the conduction electrode 311 and a plurality of first contact portions 312. The conduction terminal 31 is electrically coupled to the first wiring line 15a and is used for supplying a fixed potential from the first wiring line 15a to the common electrode 43 through the conduction member 5.

The conduction electrode 311 is disposed on the seventh interlayer insulating film 257. The conduction electrode 311 is a flat film. Accordingly, the contact surface 310, which makes contact with the conduction member 5 of the conduction electrode 311, is a flat surface. In addition, examples of the material of the conduction electrode 311 include a transparent conductive material such as ITO or IZO. Note that each material of the conduction electrode 311 may be a metal material such as aluminum, for example.

The plurality of first contact portions 312 are coupled to the conduction electrode 311. The plurality of first contact portions 312 are disposed apart from each other. The plurality of first contact portions 312 extend through the seventh interlayer insulating film 257. The first contact portion 312 is disposed in a contact hole formed in the seventh interlayer insulating film 257, and fills the contact hole. One end of the first contact portion 312 is in contact with the first wiring line 15a. The other end of the first contact portion 312 is in contact with the conduction electrode 311.

The plurality of first contact portions 312 overlap the conduction electrode 311 in plan view. The shape of each of the first contact portions 312 in plan view is smaller than the shape of the conduction electrode 311 in plan view. That is, each of the first contact portions 312 is encompassed in the conduction electrode 311 in plan view. A length L1 of each first contact portion 312 along the +z direction is longer than a thickness D1 of the conduction electrode 311.

The material of the first contact portion 312 is different from the material of the conduction electrode 311. The first contact portion 312 and the conduction electrode 311 are separate members. Examples of the material of the first contact portion 312 include metals such as tungsten, cobalt (Co), and copper (Cu), and metal materials such as metal nitrides and metal silicides. Among them, tungsten is preferable. Tungsten has excellent heat resistance. In addition, with tungsten, the first contact portion 312 can be easily formed with high definition.

Note that the number and arrangement of the first contact portions 312 are not limited to the illustrated example, and any numbers and arrangement may be adopted. For example, the number of first contact portions 312 may be one, or two or more. The same applies to the second contact portion 282 and a third contact portion 142 described later.

The first wiring line 15a coupled to the first contact portion 312 is disposed between the sixth interlayer insulating film 256 and the seventh interlayer insulating film 257. In this embodiment, the first wiring line 15a is composed of a laminate of an aluminum (Al) film 151 and a titanium nitride (TiN) film 152. The titanium nitride film 152 is in contact with the first contact portion 312. In addition, by including the aluminum film 151, the resistance can be reduced. Note that the configuration of the first wiring line 15a is not limited to the illustrated configuration. For example, the first wiring line 15a may be composed of a metal other than aluminum, a metal nitride other than titanium nitride, or a metal silicide.

Figure 7:
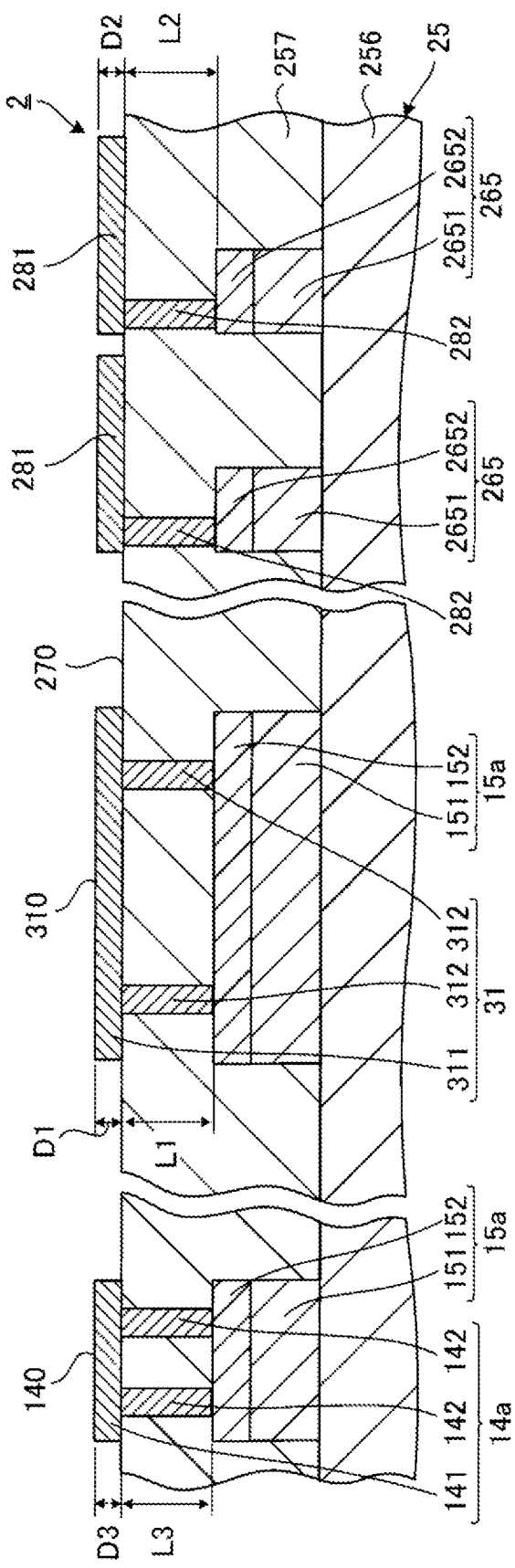
FIG. 7 is a partially enlarged view of the device substrate according to the first embodiment.

FIG. 7 is a partially enlarged view of the device substrate 2 according to the first embodiment, and is a cross-sectional view taken along X4-X4 in FIG. 5. As illustrated in FIG. 7, the supply terminal 14a is disposed on the insulator 25. The supply terminal 14a includes a supply electrode 141 and a plurality of the third contact portions 142. The supply terminal 14a is coupled to the first wiring line 15a and is used for supplying, to the first wiring line 15a, a fixed potential applied from the external wiring substrate 70.

The supply electrode 141 is disposed on the seventh interlayer insulating film 257. The supply electrode 141, the conduction electrode 311, and the pixel electrode 281 are disposed on a main surface 270 of the seventh interlayer insulating film 257. In other words, the supply electrode 141, the conduction electrode 311, and the pixel electrode 281 are disposed on the same surface. In addition, the supply electrode 141 is a flat film. Accordingly, the outer surface 140 of the supply electrode 141 is a flat surface. In addition, examples of the material of the supply electrode 141 include a transparent conductive material such as ITO and IZO. Note that each material of the supply electrode 141 may be a metal material such as aluminum, for example.

The plurality of third contact portions 142 are coupled to the supply electrode 141. The plurality of third contact portions 142 are disposed apart from each other. The plurality of third contact portions 142 extend through the seventh interlayer insulating film 257. The third contact portion 142 is disposed in the contact hole formed in the seventh interlayer insulating film 257, and fills the contact hole. One end of the third contact portion 142 is in contact with the first wiring line 15a. The other end of the third contact portion 142 is in contact with the supply electrode 141.

The plurality of third contact portions 142 overlap the supply electrode 141 in plan view. The shape of each third contact portion 142 in plan view is smaller than the shape of the supply electrode 141 in plan view. That is, each of the third contact portions 142 is encompassed in the supply electrode 141 in plan view. A length L3 of each third contact portion 142 along the +z direction is greater than a thickness D3 of the supply electrode 141. In this embodiment, the length L3 of the third contact portion 142, the length L1 of the first contact portion 312, and a length L2 of the second contact portion 282 along the +z direction are equal to each other. In addition, the thickness D3 of the supply electrode 141, the thickness D1 of the conduction electrode 311, and a thickness D2 of the pixel electrode 281 are equal to each other. Note that the "equal" is not limited to exact match, and includes a difference of 5% or less.

In this embodiment, the material of the third contact portion 142 is different from the material of the supply electrode 141. The third contact portion 142 and the supply electrode 141 are separate members. Examples of the material of the third contact portion 142 include metals such as tungsten, cobalt and copper, and metal materials such as metal nitrides and metal silicides. Among them, tungsten is preferable. Tungsten has excellent heat resistance. In addition, with tungsten, the third contact portion 142 can be easily formed with high definition.

In addition, examples of the material of the second contact portion 282 coupled to the pixel electrode 281 include metals such as tungsten, cobalt and copper, and metal materials such as metal nitrides and metal silicide. Among them, tungsten is preferable. Tungsten has excellent heat resistance. In addition, with tungsten, the second contact portion 282 can be easily formed with high definition.

In addition, while the material of the second contact portion 282 is different from the material of the pixel electrode 281 in this embodiment, the material of the second contact portion 282 may be the same as the material of the pixel electrode 281. The second contact portion 282 may be formed integrally with the pixel electrode 281. Preferably, the second contact portion 282 is formed separately from the pixel electrode 281. When separately formed, the thickness D2 of the pixel electrode 281 can be reduced in comparison with the case where they are integrally formed. As a result, the optical transparency of the pixel electrode 281 can be increased, and thus the optical characteristics of the device substrate 2 can be enhanced. In addition, while the material of the third contact portion 142 is different from the material of the supply electrode 141 in this embodiment, the material of the third contact portion 142 may be the same as the material of the supply electrode 141. The third contact portion 142 may be formed integrally with the supply electrode 141.

The electro-optical device 100 described above includes the wiring substrate 20 including the first wiring line 15a as a "wiring line", the common electrode 43, the conductive conduction member 5 that electrically couples the first wiring line 15a and the common electrode 43, and the pixel electrode 281 disposed between the wiring substrate 20 and the common electrode 43. The electro-optical device 100 includes the liquid crystal layer 9 as an "electro-optical layer" disposed between the pixel electrode 281 and the common electrode 43. The liquid crystal layer 9 includes a liquid crystal as an "electro-optical material" whose optical characteristics are changed by the electric field between the pixel electrode 281 and the common electrode 43. The wiring substrate 20 includes the seventh interlayer insulating film 257 as an "insulating layer" disposed between the first wiring line 15a and the common electrode 43. In addition, the wiring substrate 20 includes the conduction electrode 311 in contact with the seventh interlayer insulating film 257 between the seventh interlayer insulating film 257 and the common electrode 43, and the first contact portion 312 extending through the seventh interlayer insulating film 257 and serving as a "contact portion" that electrically couples the conduction electrode 311 and the first wiring line 15a. The conduction member 5 is disposed at the conduction electrode 311. The first contact portion 312 and the conduction electrode 311 are formed with different materials. Thus, the conduction electrode 311 and the first contact portion 312 are composed of different members.

With the first contact portion 312, the conduction electrode 311 has no step or has a smaller step than a known configuration can be formed. Thus, variation of the gap D due to a protrusion of the conduction member 5 from the step is prevented. In addition, variation of the gap D due to entry of the gap member 82 to the step is prevented. Since variation of the gap D in the electro-optical device 100 can be reduced or prevented in the above-mentioned manner, reduction in display quality in the electro-optical device 100 can be reduced. In addition, even when a plurality of the electro-optical devices 100 are produced, variation of the gap D among the plurality of electro-optical devices 100 can be reduced.

As described above, the thickness D3 of the conduction electrode 311 is smaller than the length L3 of the first contact portion 312 in the +z direction along the thickness direction of the wiring substrate 20. Since the thickness D3 of the conduction electrode 311 is small, variation of the gap D under the influence of the thickness D3 of the conduction electrode 311 can be reduced.

In addition, in the conduction electrode 311, the contact surface 310 that is a surface in contact with the conduction member 5 is a flat surface as described above. In other words, the conduction electrode 311 includes no step. Thus, variation of the gap D due to such a step can be reduced. In addition, for example, in the case where the contact surface 310 includes a step, the conduction member 5 is disposed at the step, and consequently the conduction member 5 having the total size of the step and the gap D are required to be used. Conversely, with the contact surface 310 that is a flat surface, the conduction electrode 311 and the common electrode 43 can be electrically coupled using the conduction member 5 having the size of the gap D. Thus, when the contact surface 310 is a flat surface, the conduction between the conduction electrode 311 and the conduction member 5 can be ensured even when the amount of the conduction member 5 is reduced in comparison with the case where a step is present. Thus, the size of the shape of the conduction electrode 311 in plan view can be reduced than that of a known configuration. As a result, size reduction of the electro-optical device 100 can be achieved.

While the contact surface 310 is flat, the contact surface 310 may have a step. In such a case, to reduce variation of the gap D, the step is preferably smaller than the length L1 of the first contact portion 312.

As described above, the wiring substrate 20 includes second contact portion 282 that extends through the seventh interlayer insulating film 257. The second contact portion 282 electrically couples the second wiring line 265 and the pixel electrode 281. The material of the pixel electrode 281 and the material of the conduction electrode 311 are preferably the same. By using the same material, the conduction electrode 311 and the pixel electrode 281 can be formed in the same step. The material of the second contact portion 282 and the material of the first contact portion 312 are preferably the same. By using the same material, the first contact portion 312 and the second contact portion 282 can be formed in the same step. As a result, the electro-optical device 100 in which variation of the gap D is reduced can be formed without increasing the processes.

Further, as described above, the wiring substrate 20 includes the supply electrode 141 that is electrically coupled to the first wiring line 15a and is configured for supplying signals to the first wiring line 15a, and the third contact portion 142 that extends through the seventh interlayer insulating film 257 and is configured to electrically couple the first wiring line 15a and the supply electrode 141. The material of the supply electrode 141 and the material of the conduction electrode 311 are preferably the same. By using the same material, the conduction electrode 311, the pixel electrode 281, and the supply electrode 141 can be formed in the same step. The material of the third contact portion 142 and the material of the first contact portion 312 are preferably the same. By using the same material, the first contact portion 312, the second contact portion 282, and the third contact portion 142 can be formed in the same step. As a result, the electro-optical device 100 in which variation of the gap D is reduced can be formed without increasing the processes.

A method of producing the first contact portion 312, the second contact portion 282, and the third contact portion 142 is as follows, for example. First, a plurality of contact holes that reach the first wiring line 15a and a plurality of contact holes that reach the second wiring line 265 are formed in the seventh interlayer insulating film 257. Thereafter, a metal material is embedded in the contact holes. Thereafter, if necessary, the seventh interlayer insulating film 257 is subjected to planarization, and the surface of the seventh interlayer insulating film 257 is planarized. Through this method, the first contact portion 312, the second contact portion 282, and the third contact portion 142 are formed.

A method of producing the conduction electrode 311, the pixel electrode 281, and the supply electrode 141 is as follows, for example. First, a layer composed of a transparent conductive material is formed on the seventh interlayer insulating film 257 by a vapor deposition method such as a PVD (physical vapor deposition) method. Thereafter, the layer is patterned using a mask having a pattern corresponding to the conduction electrode 311, the pixel electrode 281, and the supply electrode 141. Through this method, the conduction electrode 311, the pixel electrode 281, and the supply electrode 141 are formed.

As described above, the thickness D1 of a conduction electrode 311A is equal to the thickness D2 of the pixel electrode 281. Likewise, the thickness D1 of the conduction electrode 311A is equal to the thickness D3 of the supply electrode 141. As described above, by forming the conduction electrode 311, the pixel electrode 281, and the supply electrode 141 in the same step, the thickness D1, the thickness D2, and the thickness D3 can be equalized. As a result, as described above, the electro-optical device 100 in which variation of the gap D is reduced can be formed without increasing the processes.

1-2. Second Embodiment

Figure 8:
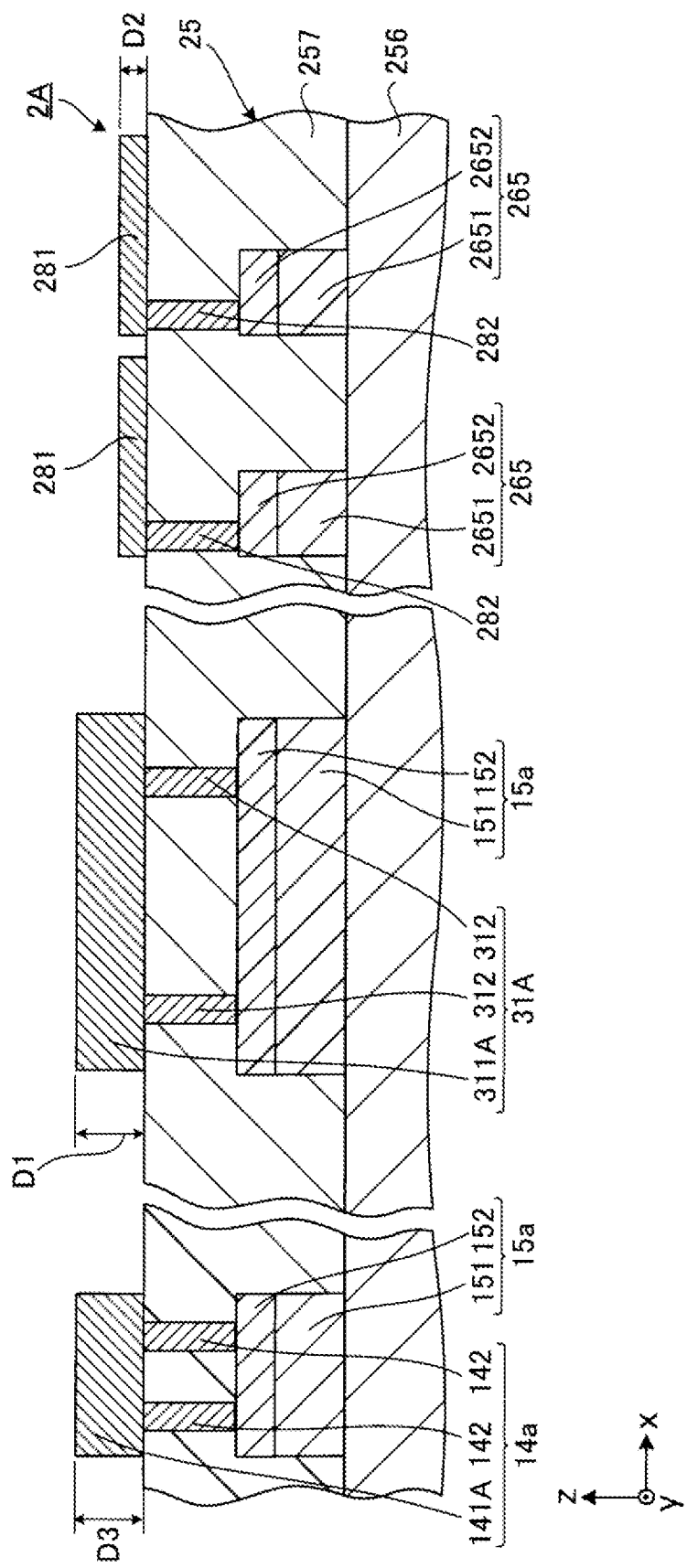
FIG. 8 is a partially enlarged view of a device substrate according to a second embodiment.

Next, a second embodiment of the present disclosure is described. FIG. 8 is a partially enlarged view of a device substrate 2A according to the second embodiment. This embodiment differs from the first embodiment in the thickness D1 of the conduction electrode 311A and the thickness D3 of a supply electrode 141A. Note that, in the second embodiment, the same reference signs are used for matters described in the first embodiment, and specific descriptions thereof are appropriately omitted.

In the device substrate 2A illustrated in FIG. 8, the thickness D1 of the conduction electrode 311A of a conduction terminal 31A is greater than the thickness D2 of the pixel electrode 281. By increasing the thickness D1 of the conduction electrode 311A, the conductivity of the conduction electrode 311A can be increased. As a result, more reliable and stable conduction with the conduction member 5 can be achieved. On the other hand, with the thickness D2 of the pixel electrode 281 smaller than the thickness D1 of the conduction electrode 311A, reduction in optical transparency of the pixel electrode 281 can be reduced.

Likewise, the thickness D3 of the supply electrode 141A is greater than the thickness D2 of the pixel electrode 281. As a result, the conductivity of the supply electrode 141A can be increased. Thus, more reliable and stable conduction with the external wiring substrate 70 can be achieved.

A method of producing the conduction electrode 311A, the pixel electrode 281, and the supply electrode 141A is as follows, for example. First, a first layer composed of a transparent conductive material is formed on the seventh interlayer insulating film 257 by a vapor deposition method such as a PVD method. Thereafter, the first layer is patterned using a mask having a pattern corresponding to the conduction electrode 311A and the supply electrode 141A. Through this patterning, a portion of the conduction electrode 311A and a portion of the supply electrode 141A are formed. Next, a second layer composed of a transparent conductive material is formed by a vapor deposition method such as a PVD method so as to cover a portion of the conduction electrode 311A and a portion of the supply electrode 141A. Thereafter, the second layer is patterned using a mask having a pattern corresponding to the conduction electrode 311A, the pixel electrode 281, and the supply electrode 141A. Through this patterning, the conduction electrode 311A, the pixel electrode 281, and the supply electrode 141A are formed.

1-3. Third Embodiment

Figure 9:
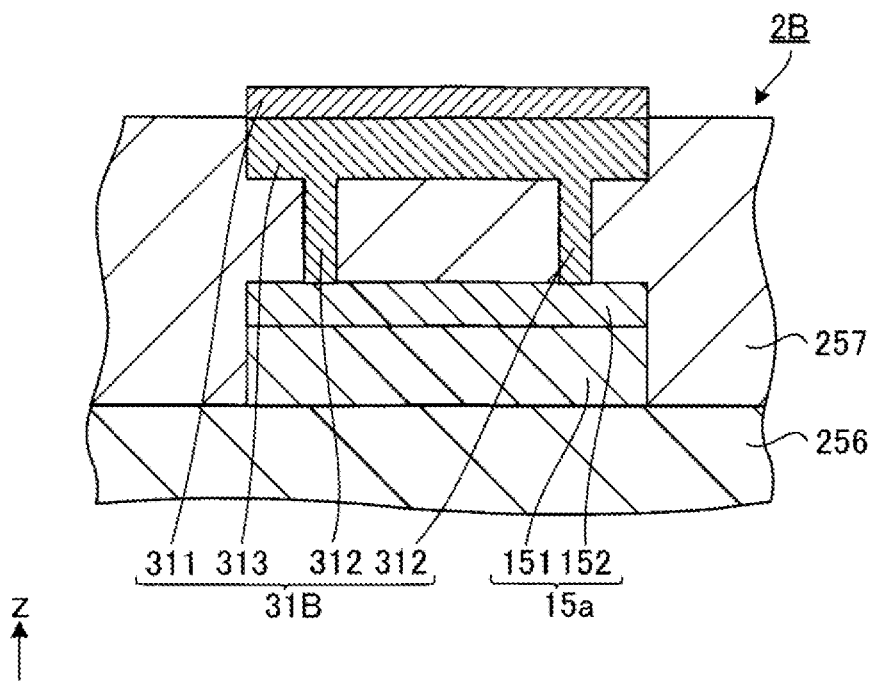
FIG. 9 is a partially enlarged view of a device substrate according to a third embodiment.

Next, a third embodiment of the present disclosure is described. FIG. 9 is a partially enlarged view of a device substrate 2B according to the third embodiment. This embodiment is different from the first embodiment in the configuration of a conduction terminal 31B. Note that, in the third embodiment, the same reference signs are used for matters described in the first embodiment, and specific descriptions thereof are appropriately omitted.

As illustrated in FIG. 9, the conduction terminal 31B of the device substrate 2B includes a connection portion 313 between the conduction electrode 311 and the plurality of first contact portions 312. The connection portion 313 has conductivity. The connection portion 313 is disposed between the conduction electrode 311 and the plurality of first contact portions 312. While the connection portion 313 is integral with the plurality of first contact portions 312 in this embodiment, they may be separate members. The connection portion 313 overlaps the conduction electrode 311 in plan view. The shape of the connection portion 313 in plan view is substantially the same as the shape of the conduction electrode 311 in plan view. The connection portion 313 encompasses the plurality of first contact portions 312 in plan view.

The material of the connection portion 313 is the same as the material of the first contact portion 312, for example. When the same material is used, the connection portion 313 is formed as follows, for example. First, a recessed portion that communicates with a contact hole corresponding to the first contact portion 312 is formed in the seventh interlayer insulating film 257. Next, a metal material such as tungsten is embedded in the contact hole and the recessed portion. By such a method, the first contact portion 312 and the connection portion 313 can be formed. In other words, the first contact portion 312 and the connection portion 313 can be formed by a so-called dual-damascene method.

In addition, with the connection portion 313, the conductivity of the conduction electrode 311 can be supplemented. Therefore, more reliable and stable conduction between the conduction electrode 311 and the conduction member 5 can be achieved in comparison with the case where the connection portion 313 is not provided.

1-4. Modification Examples

Various modifications may be made in the embodiments exemplified above. Specific modifications that may be made in the above-described embodiments are exemplified below. Any two or more modes selected from the following exemplifications may be appropriately combined insofar as they are not inconsistent with each other.

1-4a. First Modification Example

The thickness D1 of the conduction electrode 311 may be smaller than the thickness D2 of the pixel electrode 281. Likewise, the thickness D3 of the supply electrode 141 may be smaller than the thickness D2 of the pixel electrode 281.

1-4. Second Modification Example

The conduction electrode 311, the pixel electrode 281, and the supply electrode 141 may be composed of different materials. Likewise, the first contact portion 312, the second contact portion 282, and the third contact portion 142 may be composed of different materials. The same applies to the conduction electrode 311A and the first contact portion 312A.

1-4c. Third Modification Example

The first wiring line 15a and the first contact portion 312 may be electrically coupled through any electrode or the like. Likewise, the first wiring line 15a and the third contact portion 142 may be electrically coupled through any electrode or the like. The same applies to the second contact portion 282 and the second wiring line 265.

1-4d. Fourth Modification Example

While the second wiring line 265 is a relay wiring line that is electrically coupled to the pixel electrode 281 through the second contact portion 282 in the above-described embodiments, the "second wiring line" is not limited thereto. It suffices that the "second wiring line" is electrically coupled to the pixel electrode 281.

1-4e. Fifth Modification Example

The gap D may be defined by the conduction particle included in the conduction member 5. In such a case, the gap member 82 may not be included in the sealing member 8. In addition, the gap D may be defined by the gap member 82 and the conduction particles.

1-4f. Sixth Modification Example

While an exemplary case where the transistor is a TFT 260 is described in the above-described embodiments, the transistor is not limited thereto, and may be, for example, a MOSFET (metal-oxide-semiconductor field-effect transistor) or the like.

1-4g. Seventh Modification Example

While the "insulating layer" is composed of one seventh interlayer insulating film 257 in the above description, the "insulating layer" may be composed of a plurality of insulating films.

2. Reference Example

Figure 10:
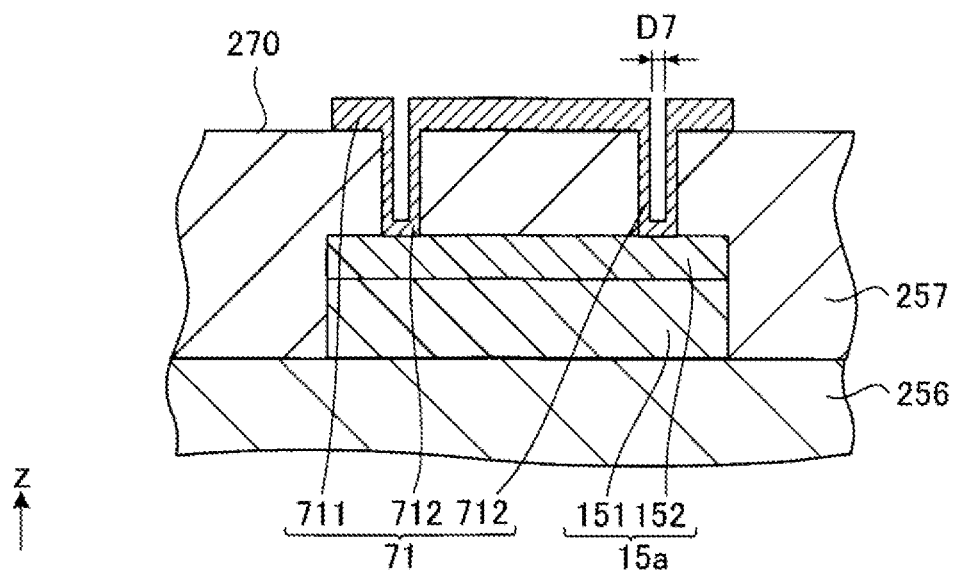
FIG. 10 is a diagram illustrating a conduction terminal of a reference example.

FIG. 10 is a diagram illustrating a conduction terminal 71 of a reference example. The conduction terminal 71 illustrated in FIG. 10 includes a step. The conduction terminal 71 includes a first portion 711 disposed on the main surface 270 of the seventh interlayer insulating film 257, and a plurality of second portions 712 that couple the first portion 711 and the first wiring line 15a. The first portion 711 and the plurality of second portions 712 are integral and are composed of the same material. The second portion 712 is disposed along the inner wall surface that forms the contact hole of the seventh interlayer insulating film 257. The width D7 of the inner surface in the plan view of the second portion 712 is smaller than the diameter of the conductive particle contained in the above-described conduction member 5. In comparison with the case where the width D7 is greater than the diameter of the conductive particle, variation of the gap D can be reduced. The width D7 is smaller than the diameter of the gap member 82. Note that, in comparison with the conduction terminal 71, the above-described conduction terminal 31 can more effectively reduce variation of the gap D while more reliably ensuring the conduction between the first wiring line 15a and the common electrode 43 through the conduction member 5.

3. Electronic Apparatus

The electro-optical device 100 can be used for various electronic apparatuses.

Figure 11:
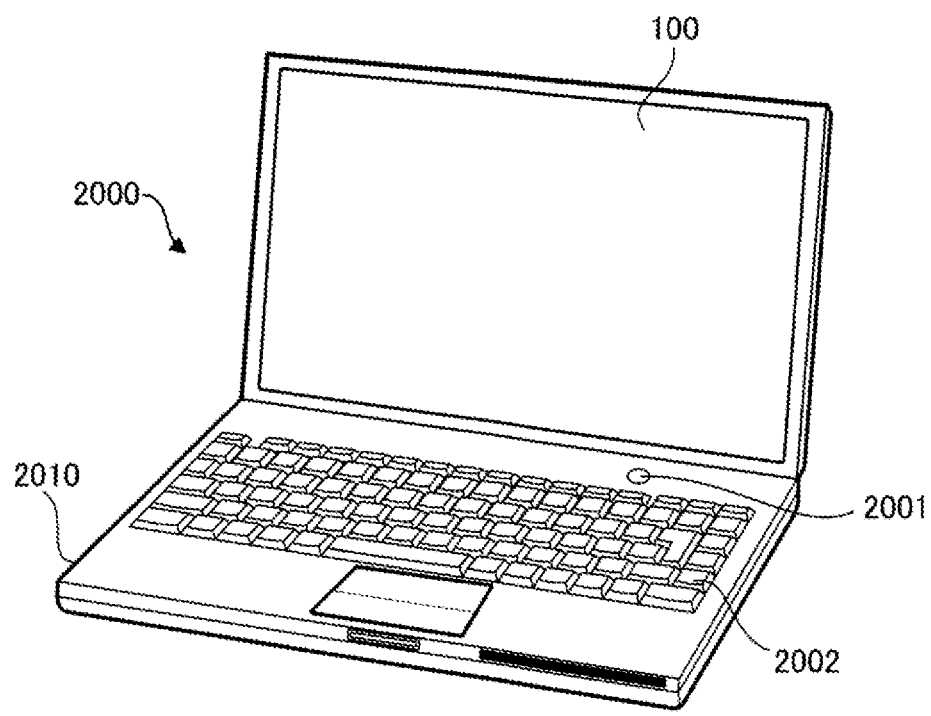
FIG. 11 is a perspective view illustrating a personal computer that is an example of an electronic apparatus.

FIG. 11 is a perspective view illustrating a personal computer 2000 that is an example of an electronic apparatus. The personal computer 2000 includes the electro-optical device 100 configured to display various images, and a main body 2010 in which a power source switch 2001 and a keyboard 2002 are installed.

Figure 12:
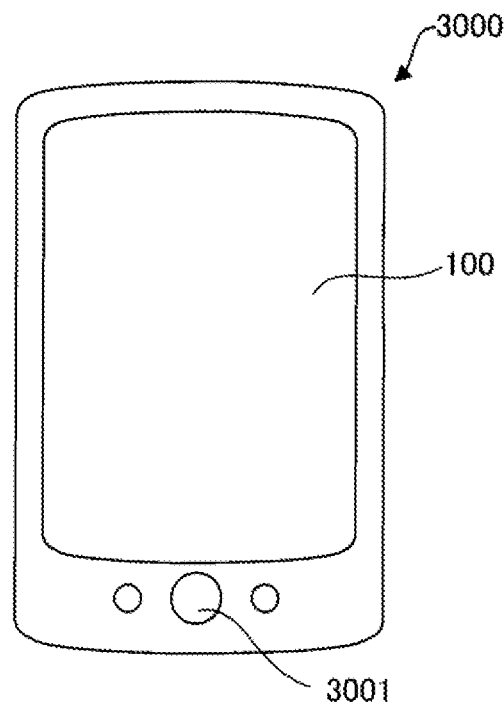
FIG. 12 is a perspective view illustrating a smart phone that is an example of an electronic apparatus.

FIG. 12 is a perspective view illustrating a smart phone 3000 that is an example of an electronic apparatus. The smart phone 3000 includes an operation button 3001 and the electro-optical device 100 configured to display various images. The details of the screen displayed on the electro-optical device 100 are changed in accordance with the operation of the operation button 3001.

Figure 13:
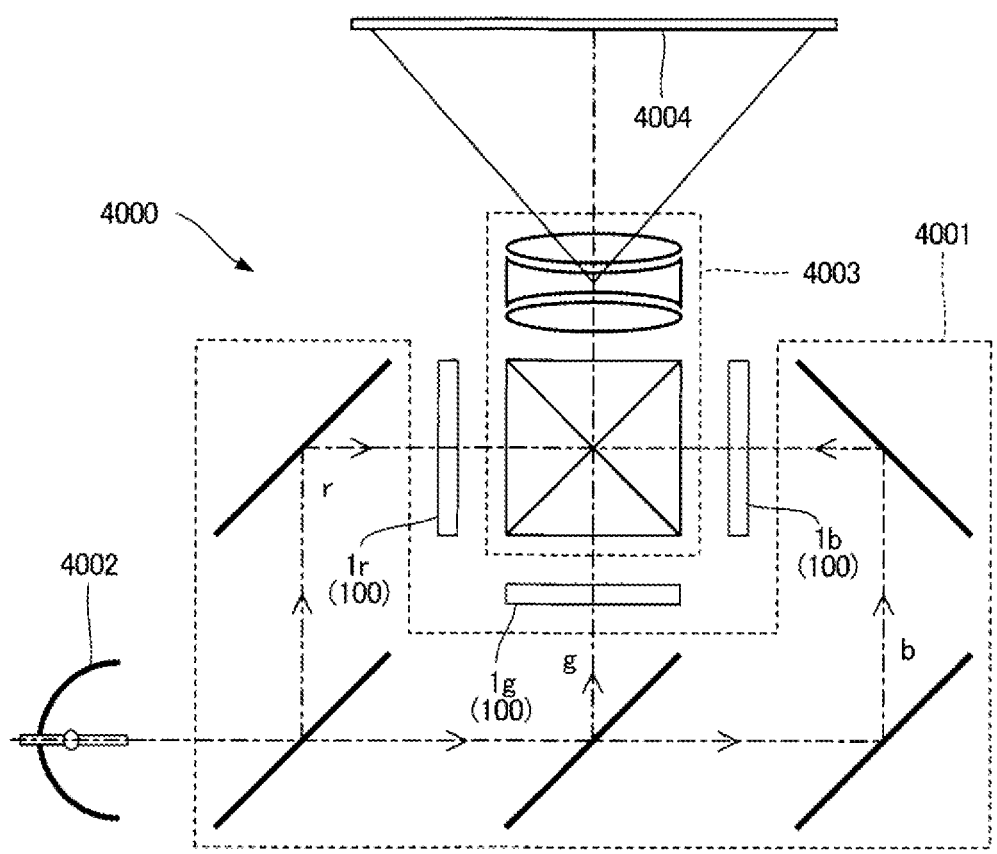
FIG. 13 is a schematic diagram illustrating a projector that is an example of an electronic apparatus.

FIG. 13 is a schematic diagram illustrating a projector that is an example of an electronic apparatus. A projection-type display device 4000 is a projector of a three-plate type, for example. An electro-optical device 1r is the electro-optical device 100 corresponding to a red display color, an electro-optical device 1g is the electro-optical device 100 corresponding to a green display color, and an electro-optical device 1b is the electro-optical device 100 corresponding to a blue display color. In other words, the projection-type display device 4000 includes three electro-optical devices, 1r, 1g, and 1b, respectively corresponding to display colors of red, green, and blue.

An illumination optical system 4001 supplies light emitted from an illumination device 4002 serving as a light source such that a red element r of the light is supplied to the electro-optical device 1r, a green element g of the light is supplied to the electro-optical device 1g, and a blue element b of the light is supplied to the electro-optical device 1b. Each of the electro-optical devices 1r, 1g, and 1b functions as an optical modulator, such as a light bulb, that modulates each monochromatic light supplied from the illumination optical system 4001 in accordance with display images. A projection optical system 4003 projects, to a projection surface 4004, the emission light from the electro-optical devices 1r, 1g, and 1b while combining the emission light.

The personal computer 2000, the smartphone 3000, and the projection-type display apparatus 4000 each include the above-described electro-optical device 100. With the electro-optical device 100, the display quality can be increased in the personal computer 2000, the smartphone 3000, and the projection-type display apparatus 4000.

The present disclosure has been described above based on the preferred embodiments, but the present disclosure is not limited to the embodiments described above. In addition, the configuration of each component of the present disclosure may be replaced with any configuration that provides a function equivalent to that of the above-described embodiments, and any configuration may be added.

Note that the electronic apparatus to which the electro-optical device according to the present disclosure is applied is not limited to the above-described apparatus, and may be a PDA (Personal Digital Assistants), a digital still camera, a television, a video camera, a car navigation apparatus, an in-vehicle display device, an electronic organizer, an electronic paper, an electronic calculator, a word processor, a workstation, a video phone, a POS (Point of Sale) terminal, or the like. Further, other examples the electronic apparatus to which the present disclosure is applied include a printer, a scanner, a copier, a video player, and an apparatus including a touch panel.

While a liquid crystal device is described as an example of the electro-optical device of the present disclosure in the above description, the electro-optical device of the present disclosure is not limited thereto. For example, the electro-optical device of the present disclosure may also be applied to an image sensor or the like. For example, the present disclosure may also be applied to a display panel using a light-emitting layer of an organic EL (electro luminescent), an inorganic EL, or a light-emitting polymer as in the above-described embodiments. In addition, the present disclosure may also be applied to an electrophoretic display panel using micro capsules containing colored liquid and white particles dispersed in the liquid as in the above-described embodiments. For example, in the case where the "electro-optical device" is an organic EL device, the light-emitting polymer corresponds to the "electro-optical material", and the light-emitting layer corresponds to the "electro-optical layer".

What is claimed is:
1. An electro-optical device, comprising:
a wiring substrate including a wiring line;
a common electrode;
a conduction member that is electrically conductive, the conduction member being configured to electrically couple the wiring line and the common electrode;
a pixel electrode disposed between the wiring substrate and the common electrode;
an electro-optical layer disposed between the pixel electrode and the common electrode, and including an electro-optical material, optical characteristics of which change due to an electric field between the pixel electrode and the common electrode; and
a sealing member, wherein
the wiring line is a first wiring line,
the wiring substrate includes:
an insulating layer disposed between the wiring line and the common electrode;
a conduction electrode between the insulating layer and the common electrode and in contact with the insulating layer, the conduction member being disposed at the conduction electrode;
a contact portion composed of a material different from that of the conduction electrode and penetrating the insulating layer, the contact portion being configured to electrically couple the conduction electrode and the wiring line;
a second wiring line;
a second contact portion penetrating the insulating layer, and being configured to electrically couple the second wiring line and the pixel electrode;
a supply electrode electrically coupled to the first wiring line, and being configured to supply a signal to the first wiring line; and
a third contact portion penetrating the insulating layer, and being configured to electrically couple the first wiring line and the supply electrode, the contact portion includes a plurality of first contact portions that are electrically coupled to the conduction electrode, the plurality of first contact portions being disposed apart from each other, a material constituting the pixel electrode and a material constituting the conduction electrode are identical to each other, a material constituting the supply electrode and the material constituting the conduction electrode are identical to each other, a material constituting the second contact portion and a material constituting the plurality of first contact portions are identical to each other, a material constituting the third contact portion and the material constituting the plurality of first contact portions are identical to each other, the sealing member is disposed between the insulating layer and the common electrode, and includes a gap member for defining a gap between the insulating layer and the common electrode, and the conduction member and the supply electrode are disposed outside the sealing member.

2. The electro-optical device according to claim 1, wherein a surface of the conduction electrode that is in contact with the conduction member is a flat surface.

3. The electro-optical device according to claim 1, wherein a thickness of the conduction electrode is equal to or greater than a thickness of the pixel electrode.

4. An electronic apparatus, comprising the electro-optical device according to claim 1.

\* \* \* \* \*